(12) United States Patent
Depraete

(10) Patent No.: US 10,018,260 B2
(45) Date of Patent: Jul. 10, 2018

(54) HYDROKINETIC TORQUE COUPLING DEVICE HAVING TURBINE-PISTON LOCK-UP CLUTCH, AND RELATED METHODS

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 305 days.

(21) Appl. No.: 14/808,797

(22) Filed: Jul. 24, 2015

(65) Prior Publication Data
US 2017/0023117 A1    Jan. 26, 2017

(51) Int. Cl.
*F16H 45/02*      (2006.01)
*F16D 25/0635*   (2006.01)

(52) U.S. Cl.
CPC ......... *F16H 45/02* (2013.01); *F16D 25/0635* (2013.01); *F16H 2045/0205* (2013.01); *F16H 2045/0221* (2013.01); *F16H 2045/0226* (2013.01); *F16H 2045/0247* (2013.01); *F16H 2045/0278* (2013.01)

(58) Field of Classification Search
CPC ............. F16H 45/02; F16H 2045/0226; F16H 2045/0278; F16H 2045/0247; F16H 2045/0205
See application file for complete search history.

(56) References Cited

U.S. PATENT DOCUMENTS

| | | |
|---|---|---|
| 2,130,895 A | 9/1938 | Ness |
| 2,860,747 A | 11/1958 | Kelley |
| 2,992,713 A | 7/1961 | Stump et al. |
| 3,041,892 A | 7/1962 | Schjolin |
| 3,252,352 A | 5/1966 | General et al. |
| 4,041,701 A | 8/1977 | Goto et al. |
| 5,713,442 A | 2/1998 | Murata et al. |
| 5,813,505 A | 9/1998 | Olsen et al. |
| 6,026,940 A | 2/2000 | Sudau |
| 6,915,886 B2 | 7/2005 | Dacho et al. |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

Lindemann et al., "iTC—Innovative Solutions for Torque Converters Pave the Way into the Future", Torque Converter 20, pp. 280-301.

(Continued)

*Primary Examiner* — Huan Le
(74) *Attorney, Agent, or Firm* — Berenato & White, LLC

(57) ABSTRACT

A hydrokinetic torque coupling device for coupling together a driving shaft and a driven shaft features a casing including a casing shell and an impeller casing shell, an impeller including the impeller shell, a turbine-piston including a turbine-piston shell, and an elastic element slidably engaging the turbine-piston and being connected to the casing. The elastic element is configured to bias the turbine-piston toward the impeller. The casing is rotatable about a rotational axis so that the impeller shell is disposed axially opposite to and fixedly connected to the casing shell. The turbine-piston is coaxially aligned with and hydro-dynamically drivable by the impeller.

21 Claims, 12 Drawing Sheets

(56) References Cited

U.S. PATENT DOCUMENTS

| | | |
|---|---|---|
| 7,191,879 B2 | 3/2007 | Arhab et al. |
| 7,445,099 B2 | 11/2008 | Maucher et al. |
| 8,276,723 B2 | 10/2012 | Verhoog et al. |
| 2003/0168298 A1 | 9/2003 | Holler et al. |
| 2003/0168299 A1 | 9/2003 | Holler et al. |
| 2004/0011032 A1 | 1/2004 | Holler et al. |
| 2006/0086584 A1 | 4/2006 | Maucher et al. |
| 2012/0043173 A1* | 2/2012 | Jameson ............ F16H 45/02 192/3.23 |
| 2013/0230385 A1 | 9/2013 | Lindemann et al. |
| 2014/0014454 A1 | 1/2014 | Davis |
| 2014/0014455 A1 | 1/2014 | Davis |
| 2014/0097055 A1 | 4/2014 | Lindemann et al. |
| 2014/0110207 A1 | 4/2014 | Davis |
| 2015/0027110 A1 | 1/2015 | Lindemann et al. |
| 2015/0037158 A1 | 2/2015 | Steinberger et al. |
| 2015/0053521 A1* | 2/2015 | Frary ............ F16H 45/02 192/3.25 |
| 2016/0116038 A1* | 4/2016 | Depraete ............ F16H 41/30 192/3.29 |
| 2016/0116041 A1* | 4/2016 | Depraete ............ F16H 45/02 192/3.29 |

FOREIGN PATENT DOCUMENTS

| | | |
|---|---|---|
| DE | 10226860 A1 | 12/2003 |
| EP | 0125428 A1 | 11/1984 |
| EP | 1744074 A2 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | 2004018897 A1 | 3/2004 |
| WO | 2004046574 A1 | 6/2004 |
| WO | WO2016130269 A1 | 8/2016 |

OTHER PUBLICATIONS

Lee et al., U.S. Appl. No. 14/305,128, filed Jun. 16, 2014.
Depraete et al., U.S. Appl. No. 14/522,302, filed Oct. 23, 2014.

* cited by examiner

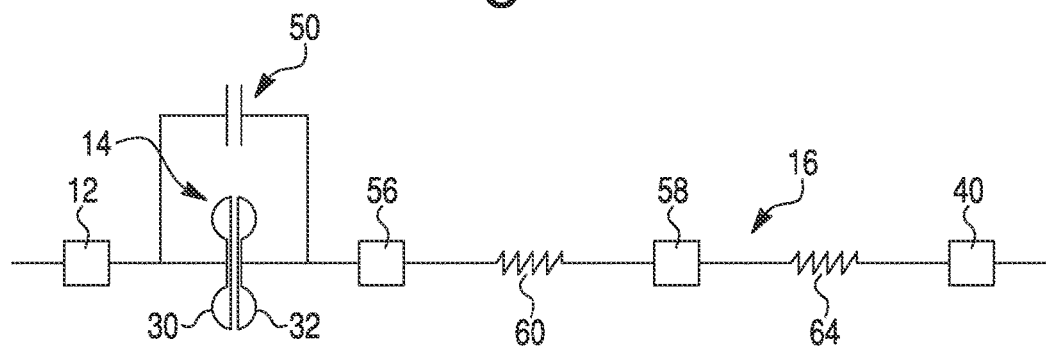
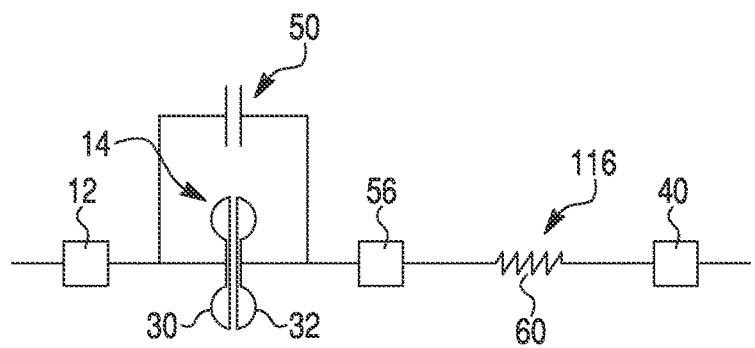

HYDROKINETIC TORQUE COUPLING DEVICE HAVING TURBINE-PISTON LOCK-UP CLUTCH, AND RELATED METHODS

BACKGROUND OF THE INVENTION

1. Field of the Invention

The present invention generally relates to hydrokinetic torque coupling devices, and more particularly to a hydrokinetic torque coupling device including a turbine-piston lock-up clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lock-up clutches and their operation are described in, for example, U.S. Pat. No. 8,276,723 and U.S. Pat. No. 7,191,879.

Depending on conditions, when the hydrokinetic torque coupling device is transmitting the movement through lock-up, the action of the transmission fluid generates axial forces, which are moving the turbine-piston away from the impeller, especially in coasting conditions of the motor vehicle when the transmission is at higher rotational speed than the engine. These conditions occur in downhill driving, for example. These forces vary depending on various factors, such as the speed and torque. Under some stable or transient conditions, these forces could move the turbine-piston away from the impeller and untimely or prematurely disengage the lock-up in unexpected circumstances, when it is not desires. This can also create a load that unable to engage the lock-up in coasting condition of the motor vehicle.

While hydrokinetic torque coupling devices with lock-up clutches have proven to be acceptable for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, a hydrokinetic torque coupling device is provided for coupling a driving shaft and a driven shaft. The torque coupling device comprises a casing rotatable about a rotational axis and having an interior volume. The casing including a casing shell and an impeller shell disposed axially opposite the casing shell fixedly connected thereto. The torque coupling device further comprises an impeller coaxially aligned with the rotational axis and including the impeller shell, a turbine-piston coaxially aligned with and hydro-dynamically drivable by the impeller, and an elastic element slidably engaging the turbine-piston and being connected to the casing. The elastic element is configured to bias the turbine-piston toward the impeller.

According to a second aspect of the invention, a method is provided for assembling a hydrokinetic torque coupling device for coupling a driving shaft and a driven shaft together. The method involves providing a torque converter that features an impeller including an impeller shell and a piston engagement portion having a first engagement surface, and a turbine-piston including a turbine-piston shell having a turbine-piston flange with a second engagement surface facing the first engagement surface and movable axially toward and away from the first engagement surface to position the hydrokinetic torque coupling device into and out of a lockup mode in which the turbine-piston is mechanically locked with so as to be non-rotatable relative to the piston engagement portion. The torque converter is combined with an elastic element and a casing shell so that the casing shell and the impeller shell collectively establish a casing of the hydrokinetic torque coupling device. The turbine-piston shell is positioned in the casing to partition an interior volume of the casing into a first chamber between the impeller shell and the turbine-piston shell and a second chamber between the turbine-piston shell and the casing shell. The elastic element is positioned to bias the turbine-piston toward the impeller.

A third aspect of the invention provides a method of coupling a driving shaft and a driven shaft together with a hydrokinetic torque coupling device. The hydrokinetic torque coupling device features at least a casing including a casing shell fixed to an impeller shell, an impeller including the impeller shell and a piston engagement portion having a first engagement surface, a turbine-piston including a turbine-piston shell having a turbine-piston flange with a second engagement surface, and an elastic element. The turbine-piston shell partitions an interior volume of the casing into a first chamber between the impeller shell and the turbine-piston shell and a second chamber between the turbine-piston shell and the casing shell. The driving shaft and the driven shaft are operatively connected to input and output parts of the hydrokinetic torque coupling device. Axial movement of the second engagement surface of the turbine-piston is controlled toward and away from the first engagement surface of the piston engagement portion to position the hydrokinetic torque coupling device into and out of a lockup mode in which the turbine-piston is mechanically locked with so as to be non-rotatable relative to the piston engagement portion. The elastic force of the elastic element biases the turbine-piston toward the impeller.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 11 is a simplified diagram of a hydrodynamic torque coupling device including a turbine-piston with dual or double damper assemblies;

FIG. 12 is a simplified diagram of another hydrodynamic torque coupling device including a turbine-piston with a single damper assembly;

Figure 1:
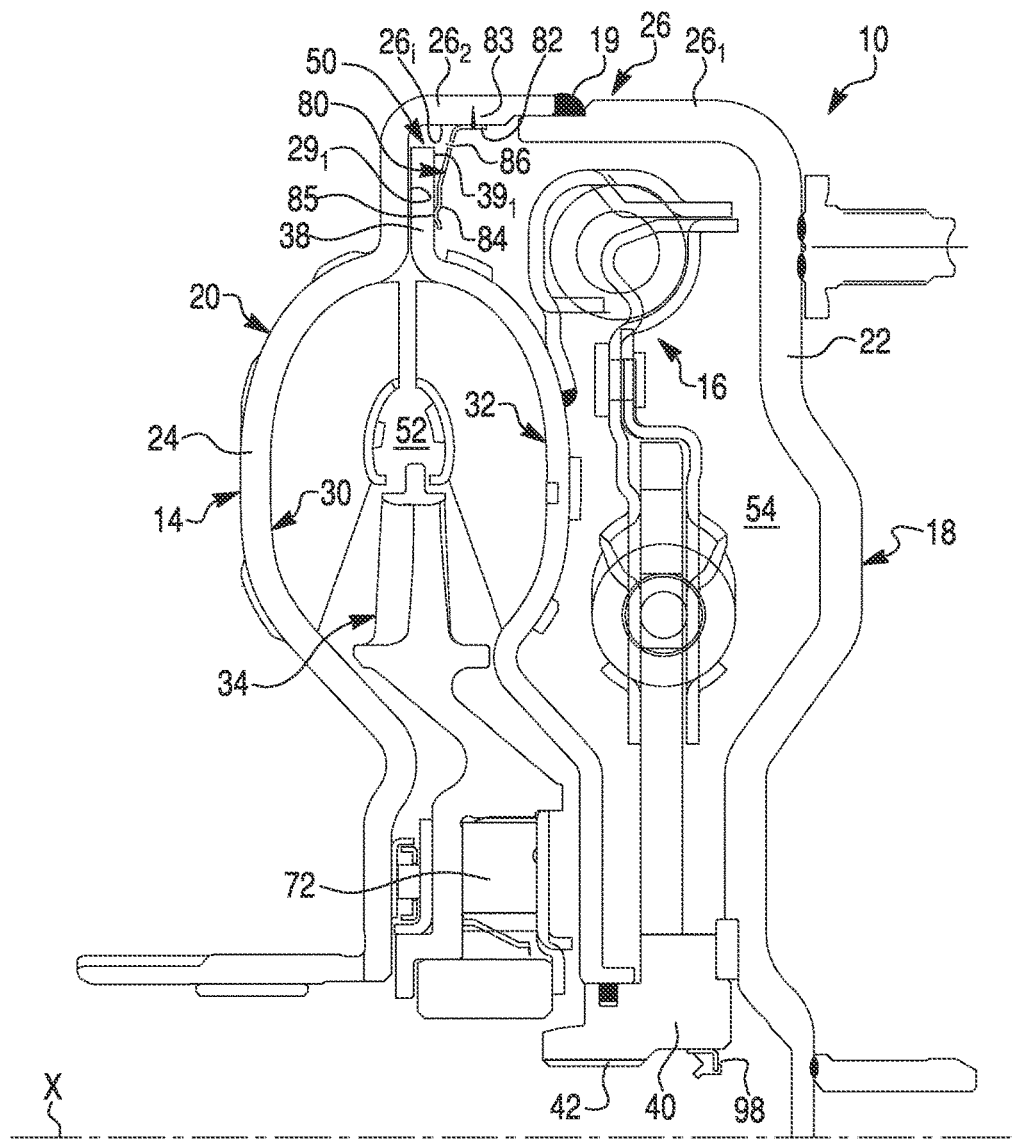
FIG. 1 is a fragmented half-view in axial section of a hydrokinetic torque coupling device in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable in known manner to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a torque converter 14, and a torsional vibration damper (also referred to herein as a damper assembly) 16 are all rotatable about a rotational axis X. The drawings discussed herein show half-views, that is, the portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 non-movably (i.e., fixedly) interconnected sealingly together, such as by welding at weld 19 at their outer peripheries. The first casing shell 18 is non-movably (i.e., fixedly) interconnected to the driving shaft, more typically a flywheel (not shown) that is fixed so as to be non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with studs 21, shown in FIG. 1. Each of the first and second casing shells 18, 20 may be made, for example, integrally by press-forming one-piece metal sheets.

The first casing shell 18 includes a first sidewall 22 extending substantially radially relative to the direction from the rotational axis X (i.e., in a plane that is generally transverse to the rotational axis X) and a cylindrical first outer wall $26_1$ extending substantially axially from the first sidewall 22 toward the second casing shell 20. Similarly, the second casing shell 20 includes a second sidewall 24 extending substantially radially relative to the direction from the rotational axis X and a cylindrical second outer wall $26_2$ extending substantially axially from the second sidewall 24 toward the first casing shell 18. The second sidewall 24 includes an integral piston engagement portion 28 having a first engagement surface $29_1$, best shown in FIG. 2. The piston engagement portion 28 is embodied as integral with the second sidewall 24 of the second casing shell 20, e.g., made of a single or unitary component. The first and second outer walls $26_1$, $26_2$ collectively establish an annular outer wall portion 26 of the casing 12, which is substantially parallel with the rotation axis X. The weld 19 fixedly secures the outer walls $26_1$ and $26_2$ together.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as an impeller shell of the impeller 30. Accordingly, the impeller shell 20 sometimes is referred to as part of the casing 12. The impeller 30 further includes a core ring 45, and a plurality of impeller blades 33 fixedly attached, such as by brazing, to the impeller shell 20 and the core ring 45. The impeller 30, including the impeller shell 20, the core ring 45, and the blades 33, is fixedly secured to so as to be non-rotatable relative to the first casing shell 18 and hence to the drive shaft (or flywheel) of the engine to rotate at the same speed as the engine output. The impeller 30 also includes an impeller hub 31 fixedly secured to the impeller shell 20. The impeller hub 31 is arranged for engagement with a hydraulic pump of the transmission.

Figure 2:
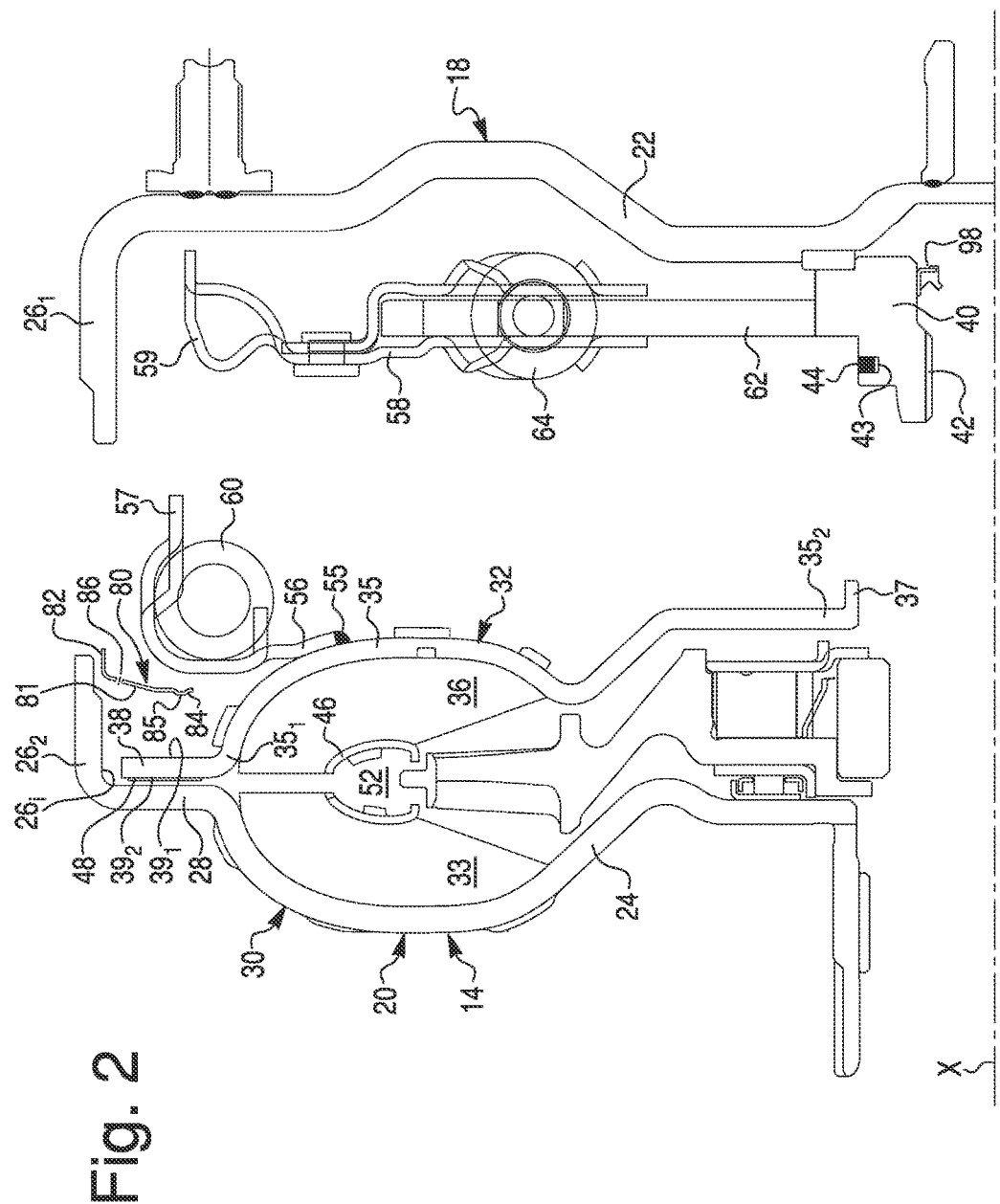
FIG. 2 is an exploded fragmentary cross-sectional view of the hydrokinetic torque coupling device of FIG. 1.

The piston engagement portion 28 is a radial extension of the impeller shell 20, is formed integrally with the impeller shell 20, and, as illustrated in FIG. 1, is disposed radially outside of the impeller blades 33. In other words, the piston engagement portion 28 and the impeller shell 20 are embodied as integral with one another, e.g., made of a single or unitary component. The piston engagement portion 28 of the second sidewall 24 is in the form of a substantially annular, planar wall and extends substantially radially relative to the rotational axis X. The first engagement surface $29_1$ of the piston engagement portion 28 faces a turbine-piston flange 38 (discussed below) and the first casing shell 18, as shown in FIGS. 1 and 2.

The torque coupling device 10 further includes an output hub 40 that is rotatable about the rotational axis X. The output hub 40 is operatively coupled to and coaxial with the driven shaft. For example, the output hub 40 may be provided with internal splines 42 for coupling the output hub 40 non-rotatably relative to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 98, mounted to a radially inner peripheral surface of the output hub 40, creates a seal at the interface of a transmission input shaft and the output hub 40.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35 and the core ring 46. The spinning of the impeller 30 causes transmission fluid in the torus to spin the turbine blades 36, and hence the turbine-piston shell 35. The impeller shell 20 and the turbine-piston shell 35 collectively define a substantially toroidal first chamber (or torus chamber) 52 therebetween. Referring to FIG. 1, the torus chamber 52 is to the left side of the turbine-piston shell 35, and a second (or damper) chamber 54 is to the other (right) side of the turbine-piston shell 35. In other words, the first chamber 52 is defined between the impeller shell 20 and the turbine-piston shell 35, while the second chamber 54 is defined between the turbine-piston shell 35 and the first casing shell 18.

The stator 34 is positioned between the impeller 30 and turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side wall 73 of the stator 34 and the impeller shell 20 of the casing 12.

Extending axially at a radially inner peripheral end $35_2$ of the turbine-piston shell 35 is a substantially cylindrical flange 37 that is proximate to the rotational axis. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movable relative to the output hub 40 along this interface respectively into and out of a lockup mode.

The piston component of the turbine-piston 32 includes a substantially annular, planar (i.e., flat) turbine-piston flange (or turbine-piston wall) 38. The turbine-piston flange 38 is distal to the rotational axis X relative to the above-discussed proximal flange 37. The turbine-piston flange 38 is a radial extension of the turbine-piston shell 35 and, as illustrated in FIG. 1, is disposed radially outside of the turbine blades 36. The turbine-piston flange 38 and the turbine-piston shell 35 are embodied as integral with one another, e.g., made of a single or unitary component, but alternatively may be separate components connected together. The turbine-piston flange 38 extends from a radially outer peripheral end $35_1$ of the turbine-piston shell 35 radially outward. The turbine-piston flange 38 extends sufficiently outward radially to axially overlap with the piston engagement portion 28 of the second casing shell 20.

As best shown in FIG. 2, the turbine-piston flange 38 has two axially opposite planar surfaces: a first surface $39_1$ facing the first sidewall 22 of the casing 12, and a second engagement surface $39_2$ facing the piston engagement portion 28 of the second casing shell 20. The first and second engagement surfaces $29_1$ and $39_2$ are parallel to and face one another, and extend radially at a 90 degree angle relative to the rotational axis X. The second engagement surface $39_2$ faces and, as explained below, is movable axially toward and away from the first engagement surface $29_1$ of the casing 12 to position the turbine-piston flange 38 of the turbine-piston 32 respectively into and out of a lockup position.

In accordance with the first exemplary embodiment, the second engagement surface $39_2$ of the turbine-piston flange 38 is provided with a friction ring (or friction lining) 48, best shown in FIG. 2. The friction ring 48 may be secured to the second engagement surface $39_2$, for example, by adhesive bonding and/or with fasteners. The friction ring 48 is made of a friction material for improved frictional performance. Alternatively, a friction ring (or friction lining) may be secured to the first engagement surface $29_1$. According to still another embodiment, a first friction ring or liner is secured to the first engagement surface $29_1$ of the casing 12 and a second friction ring or liner is secured to the second (engagement) surface $39_2$ of the turbine-piston flange 38. It is within the scope of the invention to omit one or both of the friction rings.

In the lockup mode, the first and second engagement surfaces $29_1$ and $39_2$ (or the friction ring(s) 48 secured thereto) are pressed together such that the turbine-piston flange 38 of the turbine-piston 32 is frictionally non-rotatably coupled to the piston engagement portion 28 of the casing 12, thereby mechanically locking the turbine-piston 32 to the casing 12. When not in the lockup mode, the first and second engagement surfaces $29_1$ and $39_2$ are spaced from one another, such that the turbine-piston flange 38 is not frictionally non-rotatably coupled to the casing 12. In the non-lockup mode, normal operation of the torque converter 14 fluidly couples and decouples the impeller 30 to and from the turbine-piston 32.

Figure 3:
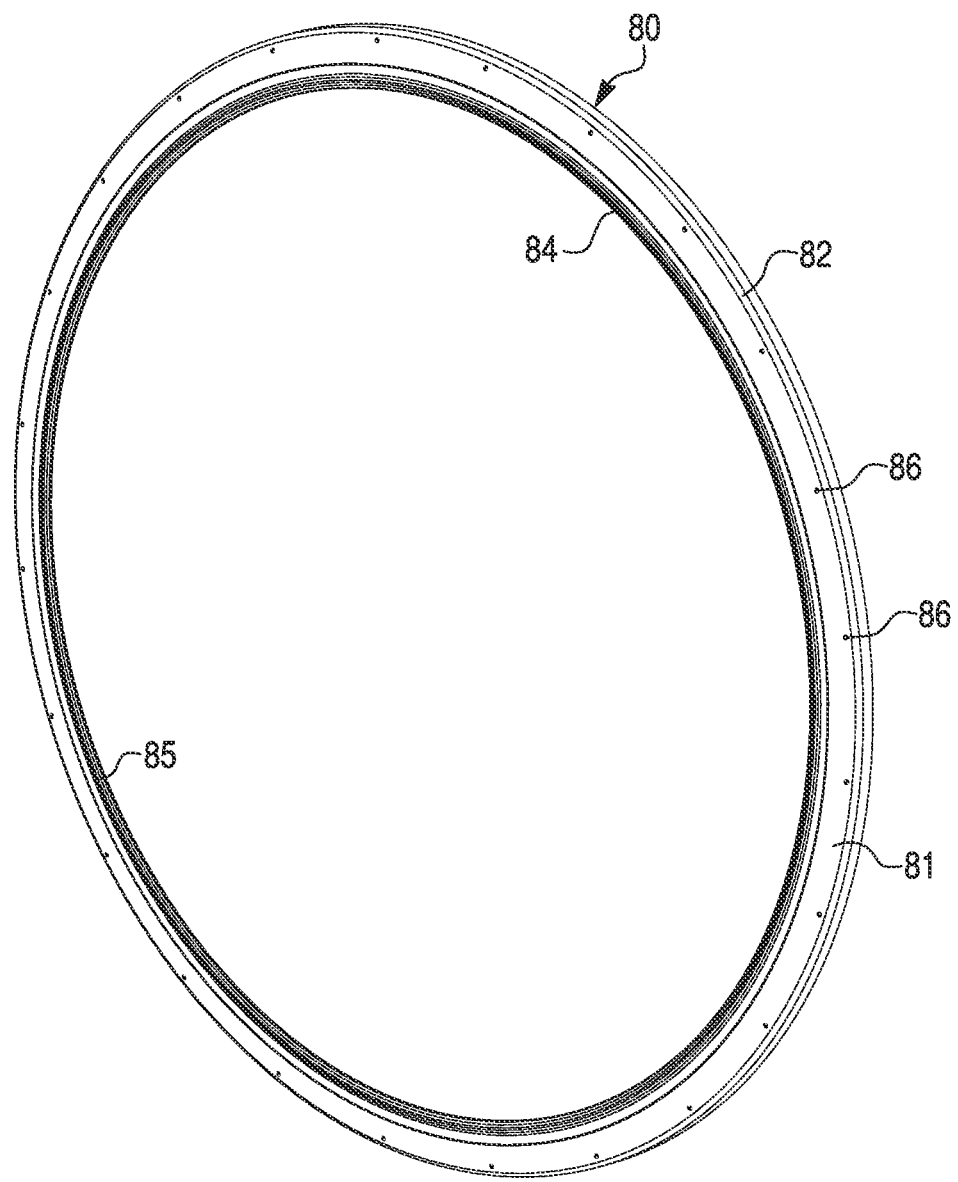
FIG. 3 is a perspective view of a restriction element in accordance with the first exemplary embodiment of the present invention.

The hydrokinetic torque coupling device 10 of the first embodiment illustrated in FIGS. 1-3, further includes an elastic element in the form of a restriction element 80. The restriction element 80 is embodied as an annular, elastic (or flexible) washer 81 that is coaxial with the rotational axis X, and is configured to bias (or force) the turbine-piston 32 against the impeller 30, especially when the torque coupling device 10 is in a non-lockup (hydrodynamic transmission) mode, so that the turbine-piston 32 is positively preloaded by the elastic washer 81 until a contact of the turbine-piston 32 with the impeller 30 is made in the lockup mode. In other words, the turbine-piston 32 is forced against the impeller 30 by the elastic force of the elastic element 80. The preload of the turbine-piston 32 is tunable (or controllable).

The elastic washer 81 includes a flanged radially outer end portion 82 non-moveably attached to a radially inner peripheral surface 26*i* of the outer wall 26 of the casing 12, such as by laser welding at 83 (FIG. 1). In the exemplary embodiment of the present invention as illustrated in FIG. 1, the radially outer end portion 82 of the elastic washer 81 is non-moveably attached to the radially inner peripheral surface of the second outer wall $26_2$ of the casing 12, such as by laser welding 83. In other words, the elastic washer 81 is axially fixed by welding to the second casing shell 20 of the casing 12. Alternatively, the radially outer end portion 82 of the elastic washer 81 may be secured to the radially inner peripheral surface 26*i* of the outer wall 26, for example, by adhesive bonding and/or with fasteners, or with any other appropriate technique. Further alternatively, the radially outer end portion 82 of the elastic washer 81 is non-moveably attached to the radially inner peripheral surface of the first outer wall $26_1$ of the casing 12.

The preload of the turbine-piston 32 is controlled (or tuned) by the position of the elastic element 80 on the radially inner peripheral surface 26*i* of the casing 12 during the welding relative to the piston engagement portion 28 or the turbine-piston flange 38. The preload of the turbine-piston 32 is easily controllable by pulling the turbine-piston 32.

The restriction element 80 also includes an opposite radially inner end portion 84 circumferentially slidably engaging a first surface $39_1$ of the turbine-piston flange 38 of the turbine-piston 32 so that the restriction element 80 is rotatable relative to the turbine-piston 32 when the device 10 is in the non-lockup (hydrodynamic transmission) mode until a contact of the turbine-piston 32 with the impeller 30 is made in the lockup mode.

The annular washer 81 includes at least one substantially annular fulcrum 85 at the radially inner end portion 84 of the annular washer 81 to localize the contact between the back of the first surface $39_1$ of the turbine-piston flange 38 of the turbine-piston 32 and the annular washer 81.

The annular washer 81 of the restriction element 80 includes one or more passages embodied in FIGS. 1-3 as calibrated holes (or fluid passages) 86 provided between the flanged ends 82, 84.

The calibrated holes 86 extend axially through the thickness of the annular washer 81 and are equidistantly circumferentially spaced from one another. The calibrated holes 86 are provided to fluidly interconnect the first chamber (or torus chamber) 52 and the second (or damper) chamber 54. Specifically, the restriction element 80 is configured to restrict fluid flow and create a pressure drop between the torus chamber 52 and the damper chamber 54 when the hydrokinetic torque coupling device 10 is out of the lockup mode. The pressure drop created by the restriction element 80 urges the turbine-piston 32 away from the impeller 30.

The calibrated holes 86 shown in the illustrated exemplary embodiment may be angled relative to the axial direction. Particularly, as illustrated in FIGS. 1-2, the calibrated holes 86 extend through the thickness of the annular washer 81 at an oblique angle relative to the axial direction. Such an angular orientation of the calibrated holes 86 creates a pumping effect which improves, in a hydrodynamic transmission (or non-lockup) mode/non-hydrodynamic transmission (or lockup) mode, suction/non-suction of the fluid into or out of the torus chamber 52. The calibrated holes 86 are illustrated circumferentially and equidistantly spaced apart from one another, although the holes 86 may be otherwise arranged. As best shown in FIG. 1, the calibrated holes 86 are disposed radially outside of the turbine-piston flange 38.

The calibrated holes 86 of the restriction element 80 have a calibrated cross-section to maintain at least a minimum of fluid flow between the torus chamber 52 and the damper chamber 54 to cool the torque converter 14. Specifically, the calibrated holes 86 of the restriction element 80 are calibrated such that, in the non-lockup (or torque convertor) mode, the hydraulic fluid which flows through the calibrated holes 86 of the restriction element 80 is of sufficient volume to provide an acceptable temperature in the torus chamber 52 in order to prevent degradation of the hydraulic fluid disposed therein. Also, the calibrated holes 86 of the restriction element 80 are calibrated such that, in the lock up mode, the hydraulic fluid which flows through the calibrated holes 86 creates a rapid decrease in load for improvement of the action of the turbine-piston 32. The calibration of the cross-section of the ax calibrated holes 86 is performed by routine calculation and testing.

In other words, the restriction element 80 fluidly isolates the torus chamber 52 from the damper chamber 54 so as to create a significant pressure drop of the fluid flow going through the restriction element 80 from the torus chamber 52 to the damper chamber 54.

Moreover, the restriction element 80 limits the displacement of the turbine-piston 32 in the direction away from the impeller 30, thus maintaining a pre-determined distance between the piston engagement portion 28 of the impeller 30 and the turbine-piston flange 38 of the turbine-piston 32 in the non-lockup mode, while at the same time biasing the turbine-piston 32 against the impeller 30.

The torsional vibration damper 16 is housed in the casing 12 axially between the turbine-piston 32 and the first sidewall 22 of the casing 12, as shown in FIG. 1. The torsional vibration damper 16 is connected to a drive (or input) member 56 (discussed below), and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1, the first and second damping members 60, 64 are configured as helical (or coil) springs having a principal axis oriented substantially circumferentially. Other elastic members may be selected to replace or supplement the springs.

The drive member 56 is fixedly connected to the turbine-piston shell 35 of the turbine-piston 32, such as by weld 55. The output side of the drive member 56 has a plurality of driving tabs 57 (FIG. 2) extending axially in the direction away from the turbine-piston 32. The driving tabs 57 of the drive member 56 are circumferentially equidistantly spaced from one another, and engage first circumferential ends of the first damping members 60.

The intermediate member 58 has a plurality of driven tabs 59 extending axially in an opposite direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 of the damper assembly 16 is rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston 32 between its lockup and non-lockup positions. As discussed in greater detail below, when the turbine-piston 32 shifts axially due to a lockup event, the driving tabs 57 move axially relative to the driven tabs 59. Thus, the drive member 56 is both axially and circumferentially moveable relative to the intermediate member 58 of the damping assembly 16.

The radially inner portion of the intermediate member 58 forms or is connected to a first disk part 68 on a first side of the second damping members 64. The first disk part 68 is non-moveably secured to a second disk part 69 on the opposite side of the second damping members 64, such as by rivets 70 or welding. The first and second disk parts 68, 69 establish an input part to the second damping members 64.

The driven member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is fixed to so as to be non-rotatably connected to the output hub 40. The non-rotatable connection between the driven member 62 and the output hub 40 may be established by splines or welding. Alternatively, the output hub 40 and driven member 62 may be integral with one another. A thrust bearing 76 is positioned between the output hub 40 and the first casing shell 18.

The damper assembly 16, in particular, the intermediate member 58, the driven member 62, and the damping members 60, 64 are not axially movable relative to one another or relative to the output hub 40. The axial movement between the drive member 56 and its driving tabs 57 relative to the driven tabs 59 allows the intermediate member 58, the driven member 62, and the damping members 60, 64 to remain fixed axially while the turbine-piston 32 and the drive member 56 move in the axial direction. In both the lockup and non-lockup modes, the drive member 56 is configured to rotationally drive the damper assembly 16 and the output hub 40.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. A pressure increase in the damper chamber 54 relative to the torus chamber 52 (or stated differently, a pressure decrease in the torus chamber 52 relative to the damper chamber 54) shifts the turbine-piston 32 axially in the direction of torque transmission, i.e., towards the output side of the casing 12, that is right to left in FIG. 1, into the lockup position. On the other hand, a pressure decrease in the damper chamber 54 relative to the torus chamber 52 (or stated differently a pressure increase in the torus chamber 52 relative to the damper chamber 54) shifts the turbine-piston shell 35 and the drive member 56 affixed thereto axially against the direction of torque transmission, i.e., towards the input side of the casing, that is left to right in FIG. 1, out of the lockup position. Pressure changes are created by control of the fluid, e.g., hydraulic fluid or oil, in the chambers 52 and 54.

In the lockup mode, the turbine-piston shell 35 is displaced axially towards the impeller 30 until the frictional ring 48 of the second engagement surface $39_2$ of the turbine-piston flange 38 (which moves axially with the turbine-piston shell 35) abuts against and is non-rotatably frictionally coupled to the first engagement surface $29_1$ of the casing 12. In the lockup mode, torque is transferred from the engine to the casing 12, then by way of the frictional engagement between surfaces $29_1$ and $39_2$ (or the frictional lining 48 thereof) to the drive member 36 welded to the turbine-piston shell 35, then serially to the damping assembly 16 and the output hub 40. Thereby, the piston engagement portion 28 of the casing 12 and the turbine-piston flange 38 of the turbine-piston 32 together create a lockup clutch that bypasses the hydrodynamic fluid coupling of the torque converter 14 and mechanically couples the driving and driven shafts. Notably, the friction ring 48 secured to the second engagement surface $39_2$ may have a plurality of circumferentially spaced grooves (not shown) extending generally radially so as to fluidly connect the torus chamber 52 and the damper chamber 54 with one another in the lockup mode for cooling friction surfaces of a lockup clutch 50 by the working fluid.

In the non-lockup mode, the turbine-piston 32 is displaced axially away from the impeller 30, axially moving the turbine-piston shell 35 and the turbine-piston flange 38 until the second engagement surface $39_2$ (or the frictional lining 48 thereof) is spaced from and no longer non-rotatably frictionally coupled to the first engagement surface $29_1$. Thus, torque transferred from the engine to the casing 12 in a hydrodynamic transmission mode does not bypass the torque converter 14 through the lockup clutch 50.

On the other hand, in the lockup mode, torque received by the locked up turbine-piston flange 38 from the casing 12 is transmitted through the turbine-piston shell 35 and the drive member 56 welded thereto at 55 to the torsional vibration damper 16, then to the output hub 40, which is connected to the driven shaft, such as by splines 42. As the turbine-piston 32 and the drive member 56 move axially into and out of lockup position as described above, the driving tabs 57 of the drive member 56 are axially displaced relative to the driven tabs 59 of the intermediate member 58. The relative axial movement between the driving tabs 57 and the driven tabs 59 allows the intermediate member 58, the driven member 62, and the damping members 60, 64 to remain fixed axially on the output hub 40 while the turbine-piston 32 and the drive member 56 move in the axial direction.

In operation, the lockup clutch 50 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be somewhat thicker than typical turbine shells that do not form or function as the lockup piston. Although not shown, a biasing member, such as a spring (e.g., a washer spring), may be included in the hydrokinetic torque coupling device 10 to axially urge the turbine-piston 32 into or out of lockup mode.

The turbine-piston 32 both forms the shell component of the turbine and the piston component of the lockup clutch, as described above. By consolidating two components that are normally separate from one another into a single component, space is saved in the torque hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment, including but not limited to the additional embodiments shown in FIGS. 4-10. In the interest of brevity, reference characters in FIGS. 4-10 that are discussed above in connection with FIGS. 1-3 are not further elaborated upon below, except to the extent necessary or useful to explain the additional embodiments of FIGS. 4-10. Modified components and parts are indicated by the addition of a hundred, two hundreds, etc. digit to the reference numerals of the components or parts.

Figure 4:
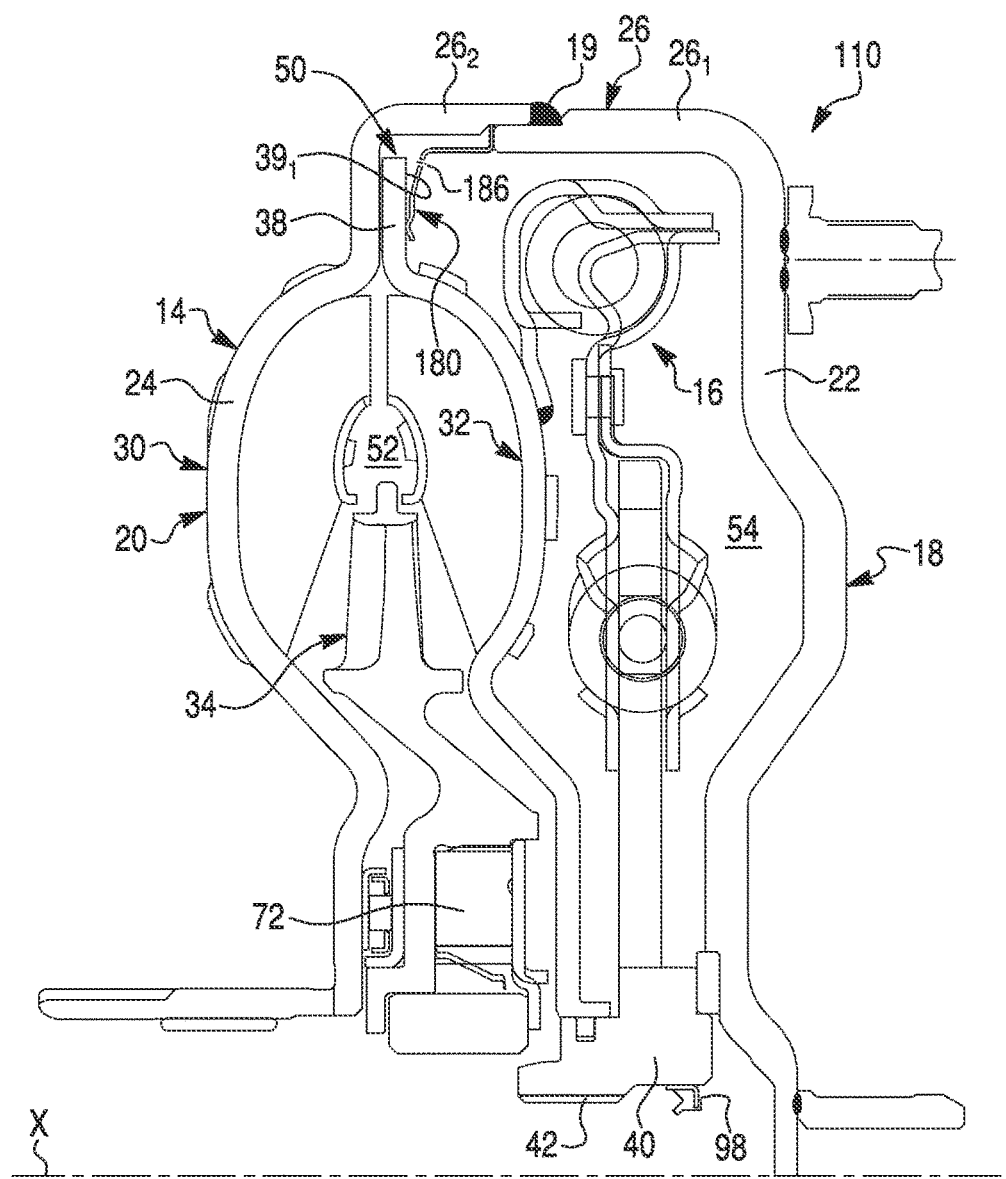
FIG. 4 is a fragmented half-view in axial section of a hydrokinetic torque coupling device in accordance with a second exemplary embodiment of the present invention.
Figure 5:
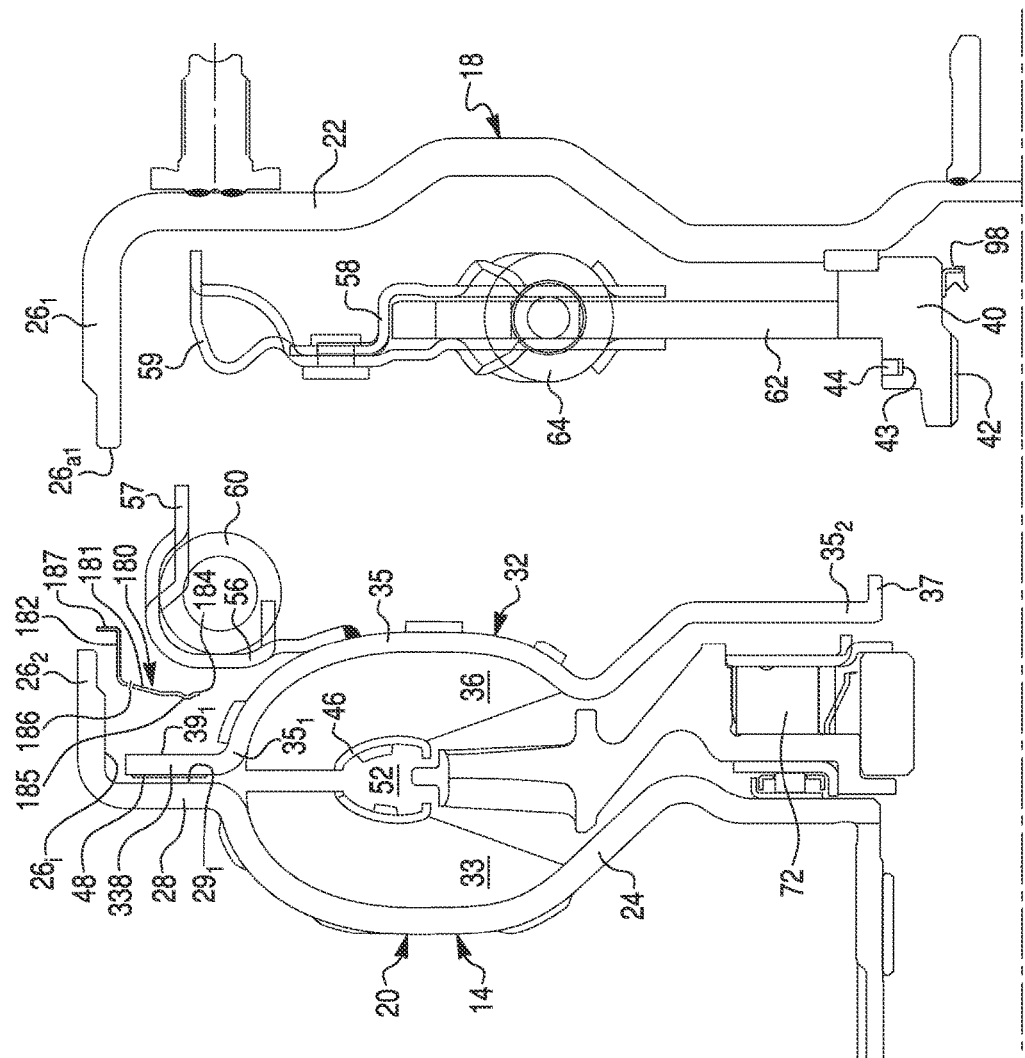
FIG. 5 is an exploded fragmentary cross-sectional view of the hydrokinetic torque coupling device of FIG. 4.
Figure 6:
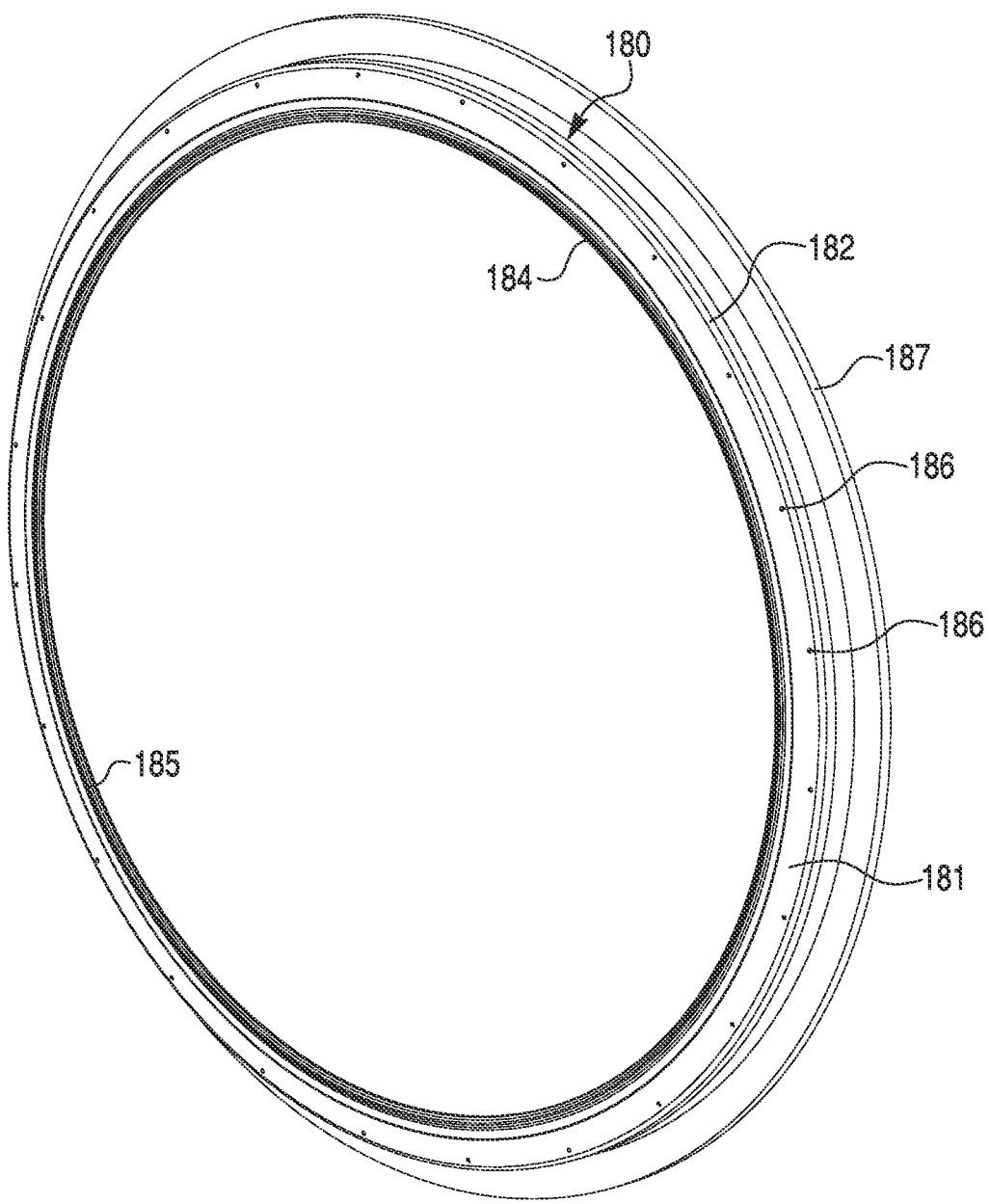
FIG. 6 is a perspective view of a restriction element in accordance with the second exemplary embodiment of the present invention.

A hydrokinetic torque coupling device 110 of a second exemplary embodiment illustrated in FIGS. 4-6, similarly to the first exemplary embodiment illustrated in FIGS. 1-3, includes a sealed casing 12, a torque converter 14, and a torsional vibration damper 16. The torque converter 14 includes an impeller 30, a turbine-piston 32, and a stator 34 interposed axially between the impeller 30 and the turbine-piston 32. The turbine-piston 32 is a consolidation or incorporation of a turbine with a lockup clutch piston. The turbine-piston 32 includes a turbine-piston shell 35, a core ring 46, and a plurality of turbine blades 36 fixedly attached, such as by brazing, to the turbine-piston shell 35 and the core ring 46. The turbine-piston 32 further includes a substantially annular, planar turbine-piston flange 38. The turbine-piston flange 38 is distal to the rotational axis X relative to the above-discussed proximal flange 37. The turbine-piston flange 38 is a radial extension of the turbine-piston shell 35 and, as illustrated in FIGS. 4 and 5, is disposed radially outside of the turbine blades 36. The turbine-piston flange 38 and the turbine-piston shell 35 are embodied as integral with one another, e.g., made of a single or unitary component, but may be separate components connected together. The turbine-piston flange 38 extends from a radially outer peripheral end $35_1$ of the torus portion of the turbine-piston shell 35 radially outward to terminate at an end in spaced relationship to the inner peripheral surface 26i of the annular outer wall portion 26 of the casing 12. Moreover, the turbine-piston flange 38 extends sufficiently outward radially to axially overlap with the piston engagement portion 28 of the second casing shell 20.

In the hydrokinetic torque coupling device 110 of the second embodiment illustrated in FIGS. 4-6, an elastic element in the form of a restriction element 180 replaces the restriction element 80 of FIGS. 1-3. The restriction element 180 is embodied as an annular, elastic (or flexible) washer 181 having a flanged radially outer end portion 182, and a radially inner end portion 184 slidably engaging a first surface $39_1$ of the turbine-piston flange 38 of the turbine-piston 32. The sliding engagement permits the restriction element 180 to rotate relative to the turbine-piston flange 38 when the torque coupling device 110 is in the non-lockup mode. The annular washer 181 is coaxial with the rotational axis X, i.e., centered in the impeller shell 20, and is configured to bias (or force) the turbine-piston 32 against the impeller 30, especially when the torque coupling device 110 is in a non-lockup (hydrodynamic transmission) mode, so that the turbine-piston 32 is positively preloaded by the elastic element 180. In other words, the turbine-piston 32 is forced against the impeller 30 by the elastic force of the elastic element 180. The preload of the turbine-piston 32 is tunable (or controllable). Moreover, the annular washer 181 limits the axial displacement of the turbine-piston 32 in the direction away from the impeller 30.

Furthermore, the radially outer end portion 182 of the annular washer 181 is formed with an annular contact flange 187 extending substantially radially outwardly. The annular contact flange 187 of the radially outer end portion 182 of the annular washer 181 axially engages (axially abuts) an axial peripheral surface $26a_1$ of the first outer wall $26_1$ of the casing 12. The preload of the turbine-piston 32 is tuned by controlling the position of the contact flange 187 of the elastic element 180 on the casing 12 relative to the piston engagement portion 28 or the turbine-piston flange 38. The preload of the turbine-piston 32 is easily controllable by pulling the turbine-piston 32. The annular washer 181 also maintains a pre-determined clearance between the impeller 30 and the turbine-piston 32.

The annular washer 181 includes at least one substantially annular fulcrum 185 at the radially inner end portion 184 of the annular washer 181 to localize the contact between the back of the first surface $39_1$ of the turbine-piston flange 38 of the turbine-piston 32 and the annular washer 181.

The annular washer 181 of the restriction element 180 includes one or more passages embodied in FIGS. 4-6 as calibrated holes 186 provided between the flanged ends 182, 184. The passages, or more specifically the embodied holes 186, maintain at least a minimum of fluid flow from the torus chamber 52 to the damper chamber 54 to cool down the torque converter 14. The calibrated holes 186 are illustrated circumferentially and equidistantly spaced apart from one another, although the holes 186 may be otherwise arranged. As best shown in FIG. 4, the calibrated holes 186 are disposed radially outside of the turbine-piston flange 38.

Similar to the first exemplary embodiment of the present invention, the restriction element 180 is configured to restrict fluid flow and create a pressure drop between the torus chamber 52 and the damper chamber 54 when the hydrokinetic torque coupling device 110 is out of the lockup mode.

Figure 7:
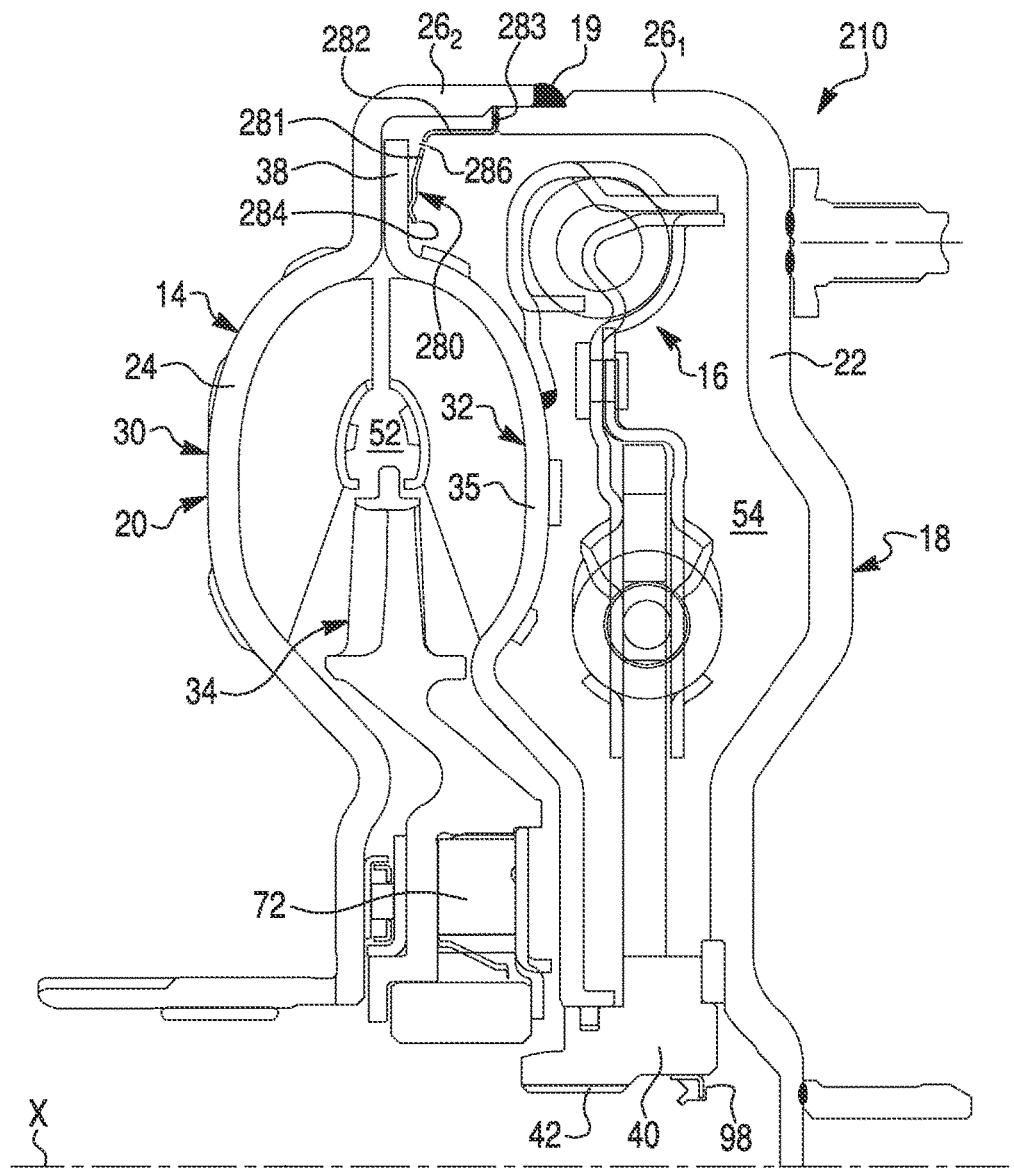
FIG. 7 is a fragmented half-view in axial section of a hydrokinetic torque coupling device in accordance with a third exemplary embodiment of the present invention.
Figure 8:
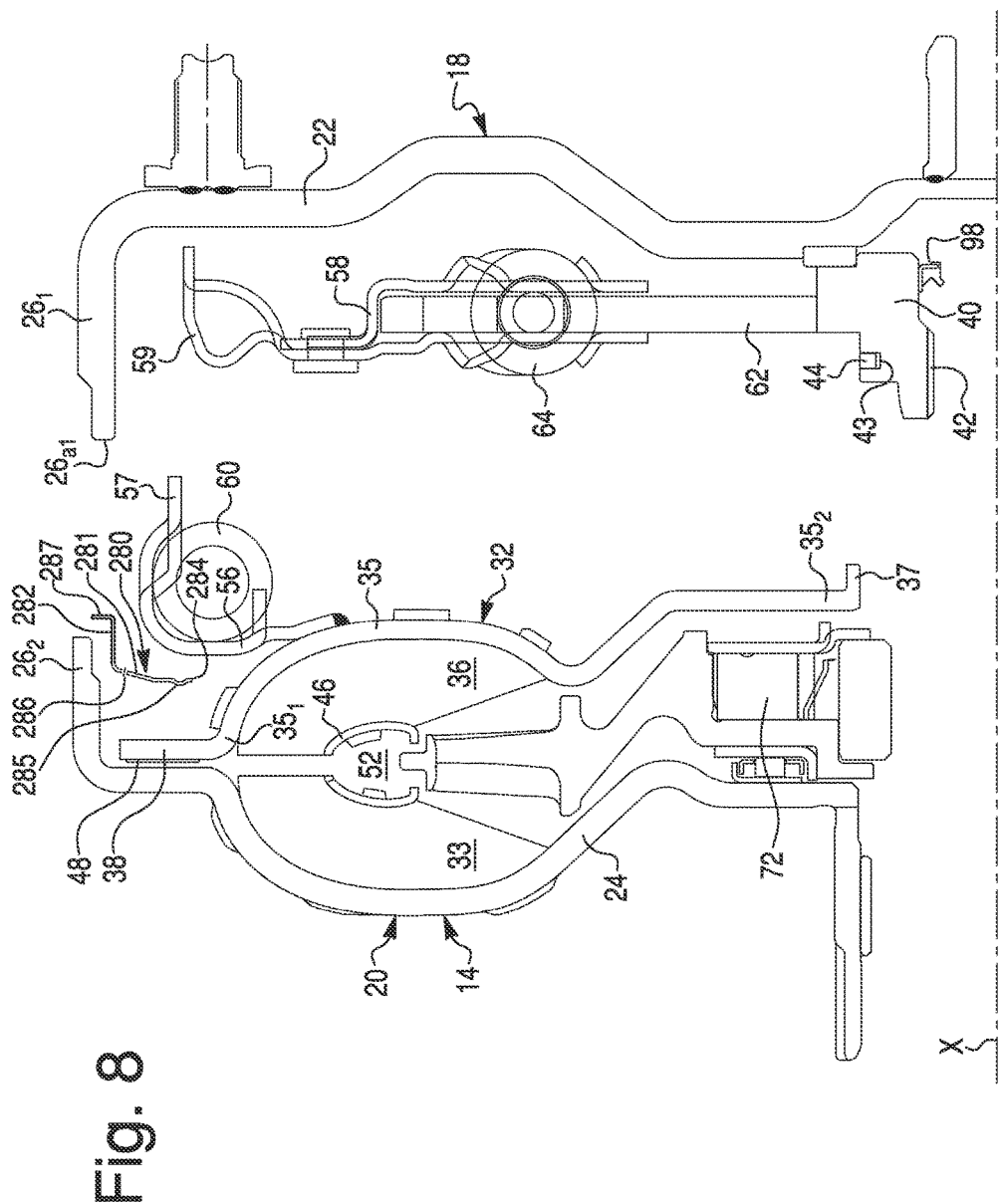
FIG. 8 is an exploded fragmentary cross-sectional view of the hydrokinetic torque coupling device of FIG. 7.

FIGS. 7 and 8 show a third exemplary embodiment of a hydrokinetic torque coupling device, generally depicted with the reference numeral 210. The hydrokinetic torque coupling device 210 corresponds substantially to the hydrokinetic torque coupling device 110 of FIGS. 4-6, and only elements, which differ, will therefore be explained in detail below.

The hydrokinetic torque coupling device 210 of the third embodiment illustrated in FIGS. 7-8, includes an elastic element in the form of a restriction element 280, which is similar to the restriction element 180 of the second exemplary embodiment of the present invention. The restriction element 280 is embodied as an annular, elastic (or flexible) washer 281 having a flanged radially outer end portion 282, and a radially inner end portion 284 slidably engaging a first surface $39_1$ of the turbine-piston flange 38 of the turbine-piston 32. The sliding engagement permits the restriction element 280 to rotate relative to the turbine-piston flange 38 when the torque coupling device 210 is in the non-lockup mode. The annular washer 281 is coaxial with the rotational axis X, i.e., centered in the impeller shell 20, and is configured to bias (or force) the turbine-piston 32 against the impeller 30, especially when the torque coupling device 210 is in a non-lockup (hydrodynamic transmission) mode. Moreover, the annular washer 281 limits the axial displacement of the turbine-piston 32 in the direction away from the impeller 30.

Furthermore, the radially outer end portion 282 of the annular washer 281 is formed with an annular contact flange 287 extending substantially radially outwardly. The contact flange 287 of the radially outer end portion 282 of the annular washer 281 non-moveably attached to an axial peripheral surface $26a_1$ of the first outer wall $26_1$ of the casing 12, such as by laser welding at 83 (shown in FIG. 7). In other words, the washer 281 is fixed by welding to the second casing shell 20 of the casing 12. The annular washer 281 also maintains a pre-determined clearance between the impeller 30 and the turbine-piston 32.

The annular washer 281 includes at least one substantially annular fulcrum 285 at the radially inner end portion 284 of the annular washer 281 to localize the contact between the back of the first surface $39_1$ of the turbine-piston flange 38 of the turbine-piston 32 and the annular washer 281.

The annular washer 281 of the restriction element 180 includes one or more passages embodied in FIGS. 7-8 as calibrated holes 286 provided between the flanged ends 282, 284. The passages, or more specifically the embodied holes 286, maintain at least a minimum of fluid flow from the torus chamber 52 to the damper chamber 54 to cool down the torque converter 14. The calibrated holes 286 are illustrated circumferentially and equidistantly spaced apart from one another, although the holes 286 may be otherwise arranged. As best shown in FIG. 7, the calibrated holes 286 are disposed radially outside of the turbine-piston flange 38.

Similar to the first exemplary embodiment of the present invention, the restriction element 280 is configured to restrict fluid flow and create a pressure drop between the torus chamber 52 and the damper chamber 54 when the hydrokinetic torque coupling device 210 is out of the lockup mode.

Figure 9:
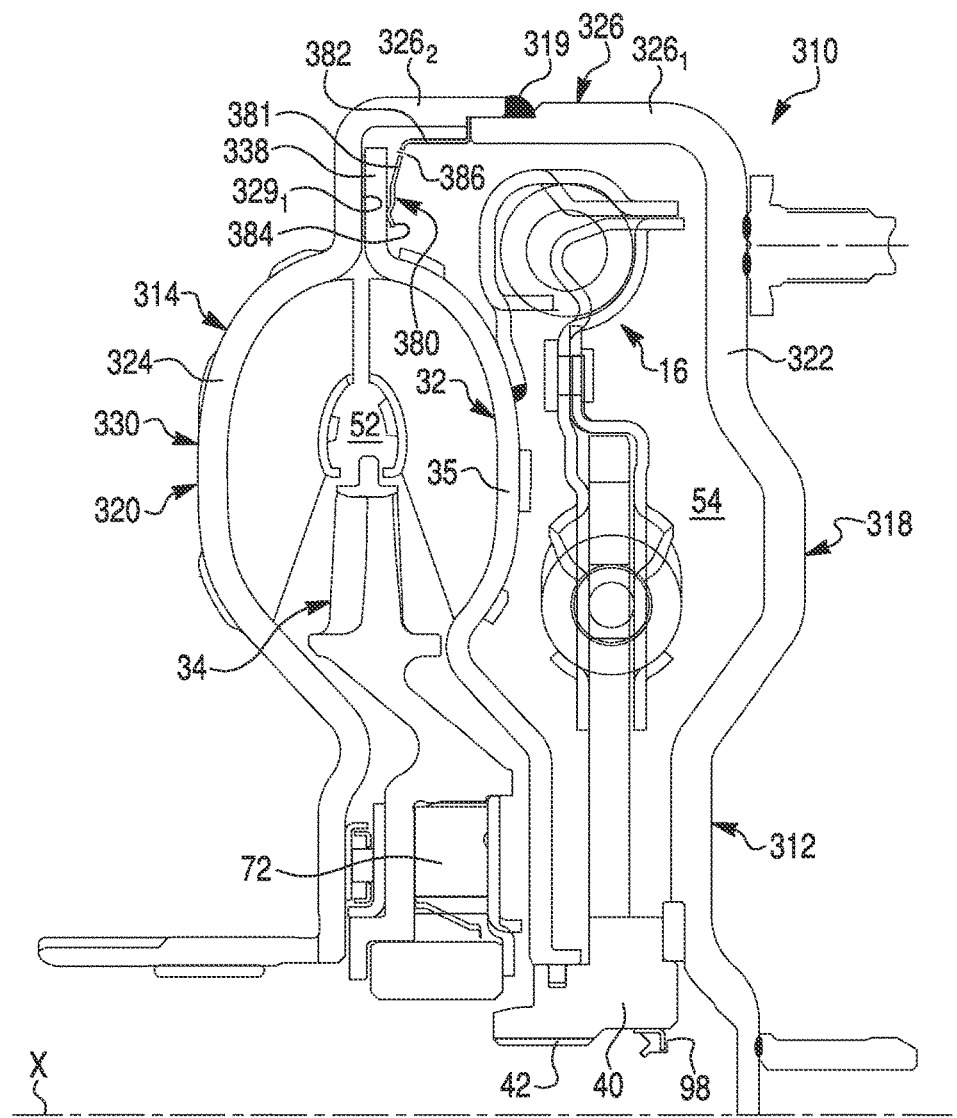
FIG. 9 is a fragmented half-view in axial section of a hydrokinetic torque coupling device in accordance with a fourth exemplary embodiment of the present invention.
Figure 10:
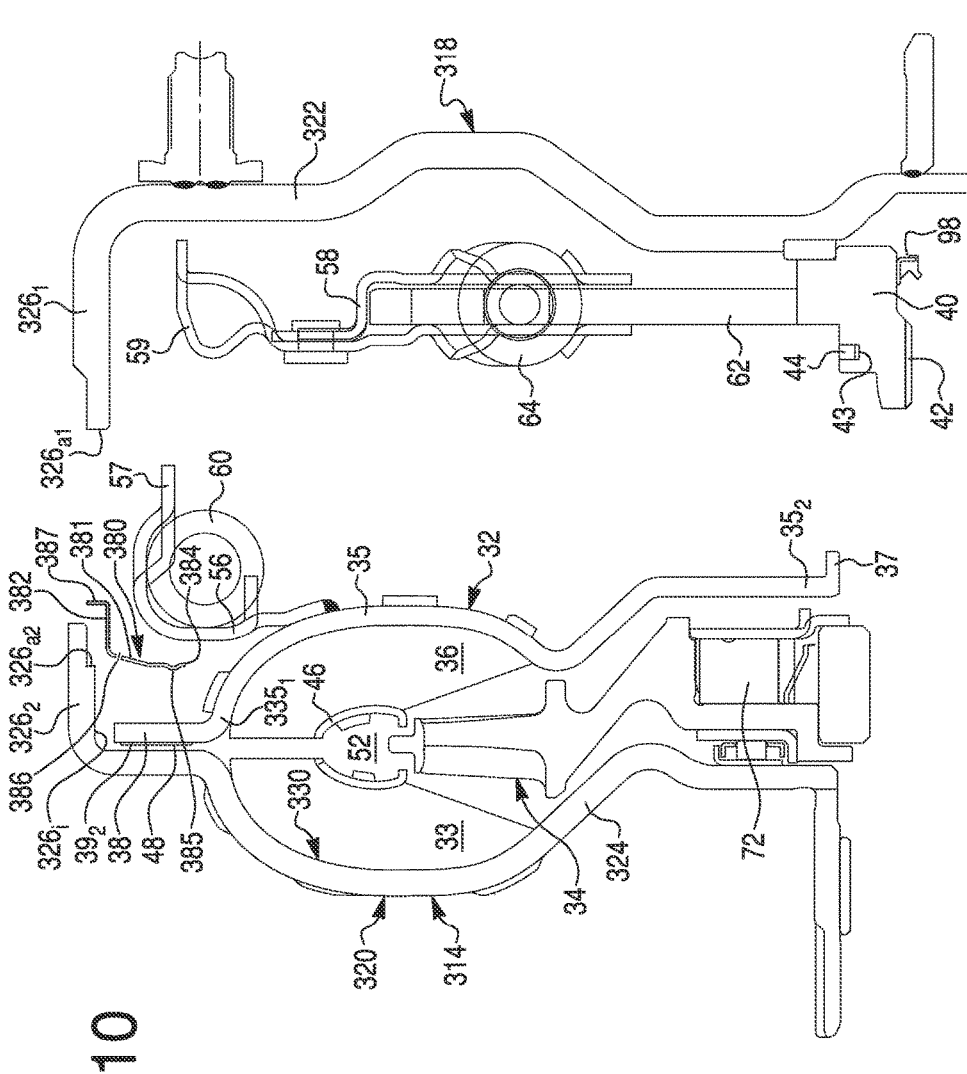
FIG. 10 is an exploded fragmentary cross-sectional view of the hydrokinetic torque coupling device of FIG. 9.

FIGS. 9-10 show a fourth exemplary embodiment of a hydrokinetic torque coupling device, generally depicted with the reference numeral 310. The hydrokinetic torque coupling device 310 corresponds substantially to the hydrokinetic torque coupling device 110 of FIGS. 4-6, and only elements, which differ, will therefore be explained in detail below.

The hydrokinetic torque coupling device 310 of the fourth embodiment illustrated in FIGS. 9-10 includes a sealed casing 312, a torque converter 314, and a torsional vibration damper 16. The sealed casing 312 includes a first casing shell 318 and a second casing shell 320 non-movably (i.e., fixedly) interconnected sealingly together at their outer peripheries, as illustrated in FIG. 9. A cylindrical first outer wall $326_1$ of the first casing shell 318 has an axial peripheral surface $326a_1$, while a cylindrical second outer wall $326_2$ of the second casing shell 320 has an axial stop member $326a_2$ facing the axial peripheral surface $326a_1$ of the first casing shell 318.

The torque converter 314 includes an impeller 330, a turbine-piston 32, and a stator 34 interposed axially between the impeller 330 and the turbine-piston 32. The turbine-piston 332 includes a turbine-piston shell 335, a core ring 46, and a plurality of turbine blades 36 fixedly attached, such as by brazing, to the turbine-piston shell 35 and the core ring 46. The turbine-piston 32 further includes a substantially annular, planar turbine-piston flange 38. The turbine-piston flange 38 is distal to the rotational axis X relative to the above-discussed proximal flange 37. The turbine-piston flange 38 is a radial extension of the turbine-piston shell 35 and, as illustrated in FIGS. 9 and 10, is disposed radially outside of the turbine blades 36. The turbine-piston flange 38 and the turbine-piston shell 35 are embodied as integral with one another, e.g., made of a single or unitary component, but alternatively may be separate components connected together. The turbine-piston flange 38 extends from a radially outer peripheral end $35_1$ of the torus portion of the turbine-piston shell 35 radially outward to terminate at an end in spaced relationship to a radially inner peripheral surface 326i of an annular outer wall portion 326 of the casing 312. Moreover, the turbine-piston flange 38 extends sufficiently outward radially to axially overlap with the piston engagement portion 328 of the second casing shell 320.

The hydrokinetic torque coupling device 310 of the fourth embodiment illustrated in FIGS. 9-10, includes an elastic element in the form of a restriction element 310, which is similar to the restriction element 180 of the second exemplary embodiment of the present invention. The restriction element 380 is embodied as an annular, elastic (or flexible) washer 381 having a flanged radially outer end portion 382, and a radially inner end portion 384 slidably engaging a first surface $39_1$ of the turbine-piston flange 38 of the turbine-piston 32. The sliding engagement permits the restriction element 380 to rotate relative to the turbine-piston flange 38 when the torque coupling device 310 is in the non-lockup mode. The annular washer 381 is coaxial with the rotational axis X, i.e., centered in the impeller shell 320, and is configured to bias (or force) the turbine-piston 32 against the impeller 330, especially when the torque coupling device 310 is in a non-lockup (hydrodynamic transmission) mode. Moreover, the annular washer 381 limits the axial displacement of the turbine-piston 32 in the direction away from the impeller 330.

Furthermore, the radially outer end portion 382 of the annular washer 381 is formed with an annular contact flange 387 extending substantially radially outwardly. The contact flange 387 of the annular washer 381 is axially sandwiched between the axial stop member $326a_2$ of the second casing shell (or impeller shell) 320 and the axial peripheral surface $326a_1$ of the first casing shell (or casing shell) 318 for preventing axial movement of the radially outer end portion 382 of the elastic element 380 relative to the casing 312.

The preload of the turbine-piston 32 is tuned by controlling the position of the contact flange 387 of the elastic element 380 on the casing 312 relative to the piston engagement portion 28 or the turbine-piston flange 38. The preload of the turbine-piston 32 is easily controllable by pulling the turbine-piston 32. The annular washer 381 also maintains a pre-determined clearance between the impeller 330 and the turbine-piston 32.

The annular washer 381 includes at least one substantially annular fulcrum 385 at the radially inner end portion 384 of the annular washer 381 to localize the contact between the back of the first surface $39_1$ of the turbine-piston flange 38 of the turbine-piston 32 and the annular washer 381.

The annular washer 381 of the restriction element 380 includes one or more passages embodied in FIGS. 9-10 as calibrated holes 386 provided between the flanged ends 382, 384. The passages, or more specifically the embodied holes 386, maintain at least a minimum of fluid flow from the torus chamber 52 to the damper chamber 54 to cool down the torque converter 314. The calibrated holes 386 are illustrated circumferentially and equidistantly spaced apart from one another, although the holes 386 may be otherwise arranged. As best shown in FIG. 9, the calibrated holes 386 are disposed radially outside of the turbine-piston flange 38.

Similar to the first exemplary embodiment of the present invention, the restriction element 380 is configured to restrict fluid flow and create a pressure drop between the torus chamber 52 and the damper chamber 54 when the hydrokinetic torque coupling device 310 is out of the lockup mode.

The features of the above-described embodiments are substitutable in numerous combinations.

An exemplary method for assembling the hydrokinetic torque coupling device 10 of the first exemplary embodiment of FIGS. 1-3 will now be explained. While the methods for assembling the hydrokinetic torque coupling devices 10, 110, 210, 310 may be practiced by sequentially performing the steps as set forth below, it should be understood that the methods may involve performing the steps in different sequences. It should be understood that this exemplary method may be practiced in connection with the other embodiments described herein. This exemplary method is not the exclusive method for assembling the hydrokinetic torque coupling devices described herein.

The exemplary method for assembling the hydrokinetic torque coupling device 10 of the first exemplary embodiment of FIGS. 1-3 is as follows. The impeller 30, the turbine-piston 32, the stator 34, and the damper 16 may each be preassembled. The turbine-piston 32 includes, as noted above, the turbine-piston shell 35 and the turbine blades 36 attached to the turbine-piston shell 35.

The radially outer end portion 82 of the annular washer 81 of the restriction element 80 is non-moveably attached to the radially inner peripheral surface 26i of the second outer wall $26_2$ of the casing 12 by laser welding at 83, preferably prior to welding the drive member 56 to the piston-turbine shell 35. Alternatively, the radially outer end portion 82 of the elastic washer 81 may be secured to the radially inner peripheral surface 26i of the outer wall 26, for example, by adhesive bonding and/or with fasteners, or with any other appropriate technique.

The impeller 30, the stator 34, and the turbine-piston 232 subassemblies are assembled together so that the second engagement surface $39_2$ of the turbine-piston flange 38 of the turbine-piston 232 faces the first engagement surface $29_1$ of the second sidewall 24 of the second casing shell 20 of the casing 12. The radially inner end portion 84 of the annular washer 81 axially slidably engages the first surface $39_1$ of the turbine-piston flange 38 of the turbine-piston 32. The drive member 56, which may be for example stamped from metal, is secured, such as by welding at the weld 55, to the turbine-piston shell 35. The damper assembly 16 is added. The cylindrical flange 37 of the turbine-piston 32 is mounted to slidingly engage the output hub 40 (splined with the driven shaft at 42) with the seal 44 therebetween. The driving tabs 57 are engaged with the damper assembly 16 as described above. Then, the first casing shell 18 is non-moveably and sealingly secured, such as by welding at 19, to the second casing shell 20, as best shown in FIG. 1.

An exemplary method for assembling the hydrokinetic torque coupling device 110 of the second exemplary embodiment of FIGS. 4-6 is as follows. The impeller 30, the stator 34, and the turbine-piston 32 subassemblies are assembled together so that the second engagement surface $39_2$ of the turbine-piston flange 38 of the turbine-piston 32 faces the first engagement surface $29_1$ of the second sidewall 24 of the second casing shell 20 of the casing 12. The restriction element 180 is mounted to the second casing shell 20 of the casing 12 so that the contact flange 187 of the radially outer end portion 182 of the annular washer 181 of the restriction element 180 ally engages (axially abuts) the axial peripheral surface $26a_1$ of the of the first outer wall $26_1$ of the first casing shell 18.

The radially inner end portion 184 of the annular washer 181 axially slidably engages the first surface $39_1$ of the turbine-piston flange 38 of the turbine-piston 32. The drive member 56 is secured, such as by welding at the weld 55, to the turbine-piston shell 35. The damper assembly 16 is added. The cylindrical flange 37 of the turbine-piston 332 is mounted to slidingly engage the output hub 40 (splined with the driven shaft at 42) with the seal 44 therebetween. The driving tabs 57 are engaged with the damper assembly 16 as described above. Then, the first casing shell 18 is non-moveably and sealingly secured, such as by welding at 19, to the second casing shell 20, as best shown in FIG. 4.

An exemplary method for assembling the hydrokinetic torque coupling device 210 of the third exemplary embodiment of FIGS. 7-8 is as follows. The impeller 30, the stator 34, and the turbine-piston 32 subassemblies are assembled together so that the second engagement surface $39_2$ of the turbine-piston flange 38 of the turbine-piston 32 faces the first engagement surface $29_1$ of the second sidewall 24 of the second casing shell 20 of the casing 12. The restriction element 280 is mounted to the second casing shell 20 of the casing 12 so that the contact flange 287 of the radially outer end portion 282 of the annular washer 281 of the restriction element 280 ally engages (axially abuts) the axial peripheral surface $26a_1$ of the of the first outer wall $26_1$ of the first casing shell 18. Then, the contact flange 287 of the annular washer 281 of the restriction element 280 is non-moveably attached to the radially inner peripheral surface 26i of the outer wall 26 of the casing 12 by laser welding at 283, preferably prior to welding the drive member 56 to the piston-turbine shell 35. Alternatively, the contact flange 287 of the elastic washer 281 may be secured to the radially inner peripheral surface 26i of the outer wall 26, for example, by adhesive bonding and/or with fasteners, or with any other appropriate technique.

The radially inner end portion 284 of the annular washer 281 axially slidably engages the first surface $39_1$ of the turbine-piston flange 38 of the turbine-piston 32. The drive member 56 is secured, such as by welding at the weld 55, to the turbine-piston shell 35. The damper assembly 16 is added. The cylindrical flange 37 of the turbine-piston 332 is mounted to slidingly engage the output hub 40 (splined with the driven shaft at 42) with the seal 44 therebetween. The driving tabs 57 are engaged with the damper assembly 16 as described above. Then, the first casing shell 18 is non-moveably and sealingly secured, such as by welding at 19, to the second casing shell 20, as best shown in FIG. 7.

An exemplary method for assembling the hydrokinetic torque coupling device 310 of the fourth exemplary embodiment of FIGS. 9-10 is as follows. The cylindrical second outer wall $326_2$ of the second casing shell 320 is formed with an axial stop member $326a_2$ facing the axial peripheral surface $326a_1$ of the first casing shell 318. The impeller 330, the stator 34, and the turbine-piston 32 subassemblies are assembled together so that a second engagement surface $39_2$ of the turbine-piston flange 38 of the turbine-piston 32 faces the first engagement surface $329_1$ of the second sidewall 324 of the second casing shell 320 of the casing 312.

The restriction element 380 is mounted to the second casing shell 320 of the casing 312 so that the contact flange 387 of the annular washer 381 is axially sandwiched between the axial stop member $326a_2$ of the second casing shell (or impeller shell) 320 and the axial peripheral surface $326a_1$ of the first casing shell (or casing shell) 318 for preventing axial movement of the radially outer end portion 382 of the elastic element 380 relative to the casing 312.

The radially inner end portion 384 of the annular washer 381 axially slidably engages the first surface $39_1$ of the turbine-piston flange 38 of the turbine-piston 32. The drive member 56 is secured, such as by welding at the weld 55, to the turbine-piston shell 35. The damper assembly 16 is added. The cylindrical flange 37 of the turbine-piston 32 is mounted to slidingly engage the output hub 40 (splined with the driven shaft at 42) with the seal 44 therebetween. The driving tabs 57 are engaged with the damper assembly 16 as described above. Then, the first casing shell 318 is non-moveably and sealingly secured, such as by welding at 319, to the second casing shell 320, as best shown in FIG. 9.

The torque converters and hydrodynamic torque coupling devices described herein may incorporate different damper assemblies. For example, FIG. 11 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 11. The diagram of FIG. 11 generally corresponds to the arrangement of the embodiments shown in FIGS. 1, 4, 7 and 9.

FIG. 12 shows an alternative damper assembly 116 similar to that of FIG. 11, but in which the damper assembly 116 is modified to include only one set of circumferentially extending elastic damping members 60.

Figure 13:
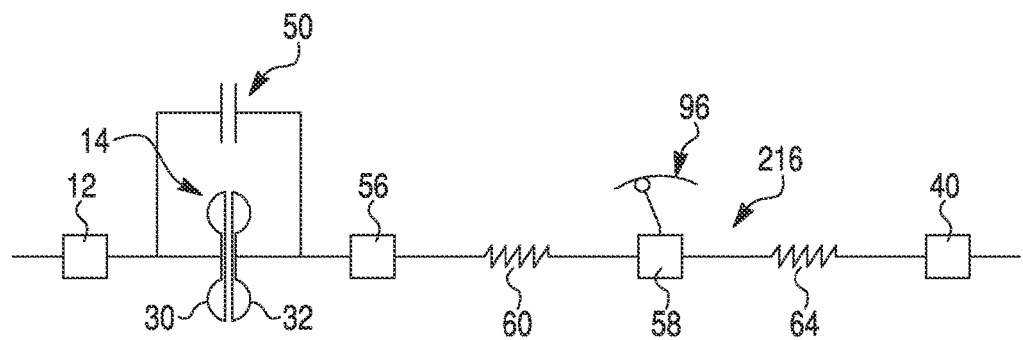
FIG. 13 is a simplified diagram of still another hydrodynamic torque coupling device including a turbine-piston with dual or double damper assemblies and a pendulum vibration absorber.

A damper assembly 216 shown in FIG. 13 is similar to that of FIG. 11, but further includes a centrifugal pendulum oscillator 96 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 96 may be coupled to the circumference of the intermediate member 58 and may be arranged on both sides of the intermediate member 58.

Figure 14:
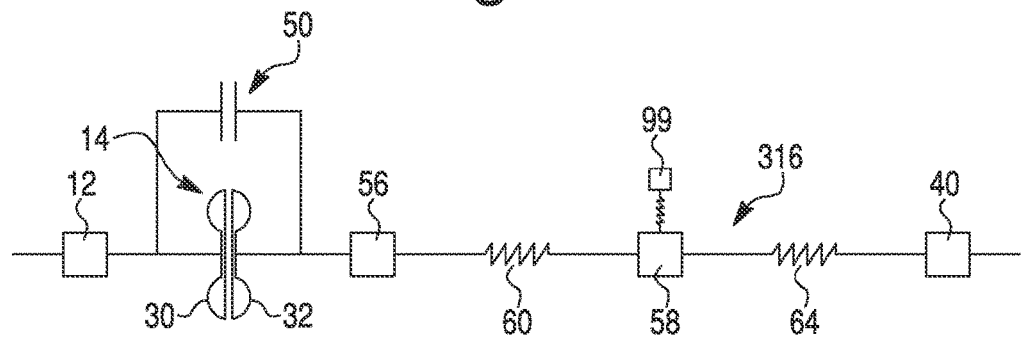
FIG. 14 is a simplified diagram of a further hydrodynamic torque coupling device including a turbine-piston with dual or double damper assemblies and a vibration absorbing spring-mass system.

A damper assembly 316 shown in FIG. 14 is similar to that of FIG. 11, but further includes a spring mass system 99 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
   a casing rotatable about a rotational axis and having an interior volume, the casing comprising a casing shell and an impeller shell disposed axially opposite to and fixedly connected to the casing shell;
   an impeller coaxially aligned with the rotational axis and comprising the impeller shell;
   a turbine-piston coaxially aligned with and hydro-dynamically drivable by the impeller; and
   an elastic element slidably engaging the turbine-piston and being connected to the casing, the elastic element configured to bias the turbine-piston toward the impeller.

2. The hydrokinetic torque coupling device as defined in claim 1, wherein the turbine-piston comprises a turbine-piston shell including a turbine-piston flange and partitioning the interior volume of the casing into a first chamber between the impeller shell and the turbine-piston shell and a second chamber between the turbine-piston shell and the casing shell; wherein the impeller shell comprises a piston engagement portion having a first engagement surface; and wherein the turbine-piston flange has a second engagement surface facing the first engagement surface and movable axially toward and away from the first engagement surface to position the hydrokinetic torque coupling device into and out of a lockup mode in which the turbine-piston is mechanically locked with the piston engagement portion so as to be non-rotatable relative to the casing.

3. The hydrokinetic torque coupling device as defined in claim 2, wherein the turbine-piston shell and the turbine-piston flange are axially movable towards an output side of the hydrokinetic torque coupling device in order to frictionally couple the first and second engagement surfaces and position the turbine-piston in the lockup mode, and wherein the turbine-piston shell and the turbine-piston flange are axially movable towards an input side of the hydrokinetic torque coupling device so that the first and second engagement surfaces are not frictionally coupled and the turbine-piston is out of the lockup mode.

4. The hydrokinetic torque coupling device of claim 3, wherein the elastic element comprises an annular washer having a radially outer end portion mounted to the casing and a radially inner end portion slidably engaging the turbine-piston flange of the turbine-piston.

5. The hydrokinetic torque coupling device of claim 4, wherein the annular washer includes at least engaging the casing shell one substantially annular fulcrum at the radially inner end portion of the annular washer, and wherein the at least one annular fulcrum slidably engages the turbine-piston flange of the turbine-piston.

6. The hydrokinetic torque coupling device of claim 4, wherein the radially outer end portion of the annular washer is non-rotatably attached to the casing.

7. The hydrokinetic torque coupling device of claim 4, wherein the radially outer end portion of the annular washer axially abuts an axial peripheral surface of the casing shell.

8. The hydrokinetic torque coupling device of claim 7, wherein the radially outer end portion of the annular washer includes an annular contact flange engaging the casing shell.

9. The hydrokinetic torque coupling device of claim 8, wherein the annular contact flange of the annular washer extends substantially radially outwardly and axially engages the axial peripheral surface of the casing shell.

10. The hydrokinetic torque coupling device of claim 9, wherein the annular contact flange of the annular washer is non-rotatably attached to the axial peripheral surface of the casing shell.

11. The hydrokinetic torque coupling device of claim 8, wherein the impeller shell of the casing includes an axial stop member facing an axial peripheral surface of the impeller shell; and wherein the annular contact flange of the annular washer is axially sandwiched between the axial stop member of the impeller shell and the axial peripheral surface of the casing shell for preventing axial movement of the radially outer end portion of the annular washer relative to the casing.

12. The hydrokinetic torque coupling device as defined in claim 2, wherein the elastic element forms a restriction element configured to restrict fluid flow and create a pressure drop between the first and second chambers when the hydrokinetic torque coupling device is out of the lockup mode.

13. The hydrokinetic torque coupling device of claim 12, wherein the restriction element comprises an annular washer having a radially outer end portion mounted to the casing and a radially inner end portion slidably engaging the turbine-piston flange of the turbine-piston, and wherein the annular washer comprises at least one fluid passage permitting fluid communication between the first and second chambers.

14. The hydrokinetic torque coupling device of claim 13, wherein the at least one passage is situated radially outside of the turbine-piston flange.

15. The hydrokinetic torque coupling device of claim 1, further comprising:
    an output hub; and
    a torsional vibration damper interconnecting the turbine-piston shell and the output hub.

16. The hydrokinetic torque coupling device of claim 15, wherein the torsional vibration damper comprises a drive member non-movably connected to the turbine-piston shell and a driven member operatively coupled to the output hub, and wherein the drive member is axially movable relative to the driven member of the torsional vibration damper.

17. The hydrokinetic torque coupling device of claim 15, further comprising a drive member interconnecting the turbine-piston shell to the torsional vibration damper, wherein the torsional vibration damper comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

18. The hydrokinetic torque coupling device of claim 15, further comprising a drive member interconnecting the turbine-piston shell to the torsional vibration damper, wherein the torsional vibration damper comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

19. The hydrokinetic torque coupling device as defined in claim 1, wherein the elastic element biases the turbine-piston toward the impeller until a contact of the turbine-piston with the impeller.

20. A method of assembling a hydrokinetic torque coupling device for coupling a driving shaft and a driven shaft together, comprising:
    providing a torque converter comprising
        an impeller comprising an impeller shell and a plurality of impeller blades, the impeller shell comprising a piston engagement portion having a first engagement surface;
        a turbine-piston coaxially aligned with and hydrodynamically drivable by the impeller, the turbine-piston comprising a turbine-piston shell and a plurality of turbine blades, the turbine-piston shell comprising a turbine-piston flange having a second engagement surface facing the first engagement surface and movable axially toward and away from the first engagement surface to position the hydrokinetic torque coupling device into and out of a lockup mode in which the turbine-piston is mechanically locked with so as to be non-rotatable relative to the piston engagement portion; and
    combining the torque converter with an elastic element and a casing shell to provide a structure in which (i) the casing shell and the impeller shell collectively establish a casing of the hydrokinetic torque coupling device, (ii) the turbine-piston shell is positioned in the casing to partition an interior volume of the casing into a first chamber between the impeller shell and the turbine-piston shell and a second chamber between the turbine-piston shell and the casing shell, and (iii) the elastic element is positioned to bias the turbine-piston toward the impeller.

21. A method of coupling a driving shaft and a driven shaft together with a hydrokinetic torque coupling device, the hydrokinetic torque coupling device comprising a casing that is rotatable about a rotational axis and comprises a casing shell and an impeller shell disposed axially opposite to and fixedly connected to the casing shell, an impeller that comprises the impeller shell and a piston engagement portion having a first engagement surface, a turbine-piston that comprises a turbine-piston shell, and an elastic element, wherein the turbine-piston shell comprises a turbine-piston flange having a second engagement surface and partitions an interior volume of the casing into a first chamber between the impeller shell and the turbine-piston shell and a second chamber between the turbine-piston shell and the casing shell, the method comprising:
- operatively connecting the driving shaft and the driven shaft to input and output parts of the hydrokinetic torque coupling device;
- controlling axial movement of the turbine-piston toward and away from the first engagement surface of the piston engagement portion to position the hydrokinetic torque coupling device into and out of a lockup mode in which the turbine-piston is mechanically locked with so as to be non-rotatable relative to the piston engagement portion; and
- biasing the turbine-piston toward the impeller by the elastic force of the elastic element.

* * * * *